United States Patent
Zong et al.

(10) Patent No.: US 11,209,934 B2
(45) Date of Patent: Dec. 28, 2021

(54) VOLTAGE DRIVING METHOD AND DEVICE FOR TOUCH DISPLAY PANEL, AND TOUCH DISPLAY PANEL

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Shaolei Zong, Beijing (CN); Jieqiong Wang, Beijing (CN); Jigang Sun, Beijing (CN); Yanfei Ren, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 363 days.

(21) Appl. No.: 16/472,010

(22) PCT Filed: Nov. 23, 2018

(86) PCT No.: PCT/CN2018/117117
§ 371 (c)(1),
(2) Date: Jun. 20, 2019

(87) PCT Pub. No.: WO2019/141002
PCT Pub. Date: Jul. 25, 2019

(65) Prior Publication Data
US 2021/0333972 A1     Oct. 28, 2021

(30) Foreign Application Priority Data
Jan. 16, 2018   (CN) .......................... 201810038707.X

(51) Int. Cl.
*G06F 3/041* (2006.01)
*G06F 3/044* (2006.01)

(52) U.S. Cl.
CPC ........ *G06F 3/04166* (2019.05); *G06F 3/0446* (2019.05)

(58) Field of Classification Search
CPC ............... G06F 3/04166; G06F 3/0446; G06F 2203/04107
See application file for complete search history.

(56) References Cited

U.S. PATENT DOCUMENTS

| 8,199,092 | B2 * | 6/2012 | Chen | .................... G09G 3/3655 |
|---|---|---|---|---|
| | | | | 345/94 |
| 9,298,307 | B2 * | 3/2016 | Chen | .................... G06F 3/0412 |
| (Continued) | | | | |

FOREIGN PATENT DOCUMENTS

| CN | 101311781 A | 11/2008 |
|---|---|---|
| CN | 102929460 A | 2/2013 |
| (Continued) | | |

OTHER PUBLICATIONS

First Office Action dated Mar. 22, 2019 corresponding to Chinese application No. 201810038707.X.

(Continued)

*Primary Examiner* — Michael Pervan
(74) *Attorney, Agent, or Firm* — Nath, Goldberg & Meyer; Joshua B. Goldberg

(57) ABSTRACT

The present disclosure provides a voltage driving method and device for a touch display panel, and a touch display panel, which includes a common electrode extending in a first direction and a plurality of columns of touch electrodes extending parallel to each other in a second direction. The voltage driving method includes: applying a first scanning voltage to two outermost columns of touch electrodes during a first period of a first touch cycle including a plurality of periods, the first scanning voltage being equal to a reference voltage; detecting a first output voltage output by the two outermost columns of touch electrodes during the first period; and adjusting, based on the detected first output voltage, the scanning voltage applied to the two outermost (Continued)

columns of touch electrodes during a first period of a second touch cycle immediately after the first touch cycle, to a second scanning voltage.

20 Claims, 3 Drawing Sheets

(56) References Cited

U.S. PATENT DOCUMENTS

| | | | |
|---|---|---|---|
| 9,360,979 B2* | 6/2016 | Liu | G02F 1/13338 |
| 10,175,812 B2* | 1/2019 | Ji | G06F 3/0443 |
| 10,318,068 B2* | 6/2019 | Guo | G06F 3/04184 |
| 2008/0158178 A1 | 7/2008 | Hotelling et al. | |
| 2014/0218331 A1* | 8/2014 | Chang | G06F 3/0446 |
| | | | 345/174 |

FOREIGN PATENT DOCUMENTS

| | | |
|---|---|---|
| CN | 103400564 A | 11/2013 |
| CN | 104090696 A | 10/2014 |
| CN | 104090697 A | 10/2014 |
| CN | 105808011 A | 7/2016 |
| CN | 106293217 A | 1/2017 |
| CN | 106444188 A | 2/2017 |
| CN | 106601170 A | 4/2017 |
| CN | 106652968 A | 5/2017 |
| CN | 106842745 A | 6/2017 |
| CN | 107978295 A | 5/2018 |
| KR | 1020170036852 A | 4/2017 |

OTHER PUBLICATIONS

International Search Report dated Feb. 27, 2019 corresponding to application No. PCT/CN2018/117117.

* cited by examiner apply, during a first touch cycle, a respective scanning voltage to each column of touch electrodes of the touch display panel by time division multiplexing the common electrode, in which a first scanning voltage is applied to two outermost columns of touch electrodes of the touch display panel during a first period of the first touch cycle — 101 detect, during the first period of the first touch cycle, a first output voltage output by at least one of the two outermost columns of touch electrodes of the touch display panel — 102 adjust, to a second scanning voltage, a scanning voltage applied to the at least one of the two outermost columns of touch electrodes of the touch display panel during a first period of a second touch cycle immediately after the first touch cycle by using the detected first output voltage, such that a second output voltage output by the at least one of the two outermost columns of touch electrodes of the touch display panel during the first period of the second touch cycle is the reference voltage — 103

Fig.2

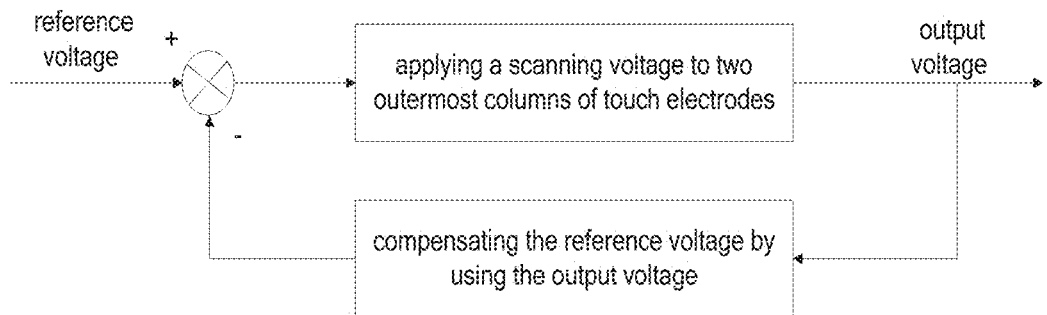

Fig.3

VOLTAGE DRIVING METHOD AND DEVICE FOR TOUCH DISPLAY PANEL, AND TOUCH DISPLAY PANEL

CROSS-REFERENCE TO RELATED APPLICATION

This is a National Phase Application filed under 35 U.S.C. 371 as a national stage of PCT/CN2018/117117, filed Nov. 23, 2018, an application claiming the benefit to Chinese Application No. 201810038707.X filed on Jan. 16, 2018, the disclosure of which is hereby incorporated by reference in its entirety.

TECHNICAL FIELD

The present disclosure relates to the field of display technology, in particular, to a voltage driving method and device for a touch display panel, and a touch display panel.

BACKGROUND

In some cases, in order to enhance the electrostatic discharge (ESD) of a touch display panel, the touch display panel is disposed with a grounding wire (GND) in the periphery of the touch display panel such that the display panel is common-grounded with a flexible printed circuit (FPC). However, since the grounding wire located in the periphery of the touch display panel may generate a parasitic capacitance with a color filter substrate, a capacitance of the peripheral of the touch display panel increases and a voltage of the peripheral of the touch display panel is unstable, which seriously affect touch performance of the touch display panel.

SUMMARY

The present disclosure provides a voltage driving method for a touch display panel. The touch display panel includes a common electrode extending in a first direction and a plurality of columns of touch electrodes extending parallel to each other in a second direction. The first direction intersects the second direction. The method includes: applying a first scanning voltage to two outermost columns of touch electrodes of the touch display panel during a first period of a first touch cycle, the first touch cycle comprising a plurality of periods, the first scanning voltage being equal to a reference voltage; detecting a first output voltage output by at least one of the two outermost columns of touch electrodes during the first period of the first touch cycle; and adjusting, based on the detected first output voltage, a scanning voltage applied to the at least one of the two outermost columns of touch electrodes during a first period of a second touch cycle immediately after the first touch cycle to a second scanning voltage, such that a second output voltage output by the at least one of the two outermost columns of touch electrodes during the first period of the second touch cycle is equal to the reference voltage.

In an embodiment, during periods of the first touch cycle other than the first period, the reference voltage is applied to each column of touch electrodes of the touch display panel other than the two outermost columns of touch electrodes.

In an embodiment, the adjusting, based on the detected first output voltage, the scanning voltage applied to the at least one of the two outermost columns of touch electrodes during the first period of the second touch cycle immediately after the first touch cycle, to the second scanning voltage, such that the second output voltage output by the at least one of the two outermost columns of touch electrodes during the first period of the second touch cycle is equal to the reference voltage includes: calculating a difference by subtracting the first output voltage from the reference voltage to form a compensation signal, and compensating the first scanning voltage by using the compensation signal to obtain the second scanning voltage, such that the second output voltage output by the at least one of the two outermost columns of touch electrodes during the first period of the second touch cycle is equal to the reference voltage.

In an embodiment, the compensating the first scanning voltage by using the compensation signal includes: superimposing the compensation signal with the first scanning voltage to obtain the second scanning voltage. If the difference is positive, the compensation signal is a positive voltage signal; and if the difference is negative, the compensation signal is a negative voltage signal.

In an embodiment, the method further includes: applying, during each period of each touch cycle other than the first period, the reference voltage to several outermost columns of touch electrodes of the touch display panel among the columns of touch electrodes to which the scanning voltage has not been applied during the touch cycle.

In an embodiment, during each period of each touch cycle other than the first period, the reference voltage is applied to 4 outermost columns of touch electrodes of the touch display panel among the columns of touch electrodes to which the scanning voltage has not been applied during the touch cycle.

In an embodiment, during each period of each touch cycle other than the first period, the reference voltage are sequentially applied to the columns of touch electrodes other than the two outermost columns of touch electrodes according to an arrangement sequence of the plurality of columns of touch electrodes.

The present disclosure further provides a voltage driving device for the above touch display panel. The voltage driving device includes a voltage applying portion, a voltage detection portion and a voltage control portion. The voltage applying portion is configured to apply a first scanning voltage to two outermost columns of touch electrodes of the touch display panel during a first period of a first touch cycle, the first touch cycle comprising a plurality of periods, the first scanning voltage being equal to a reference voltage. The voltage detection portion is configured to detect a first output voltage output by at least one of the two outermost columns of touch electrodes during the first period of the first touch cycle. The voltage control portion is configured to adjust, based on the detected first output voltage, a scanning voltage applied to the at least one of the two outermost columns of touch electrodes during a first period of a second touch cycle immediately after the first touch cycle to a second scanning voltage, such that a second output voltage output by the at least one of the two outermost columns of touch electrodes during the first period of the second touch cycle is equal to the reference voltage.

In an embodiment, the voltage applying portion is further configured to apply the reference voltage to each column of touch electrodes of the touch display panel other than the two outermost columns of touch electrodes, during periods of the first touch cycle other than the first period.

In an embodiment, the voltage control portion is further configured to calculate a difference by subtracting the first output voltage from the reference voltage to form a compensation signal, and compensate the first scanning voltage by using the compensation signal to obtain the second scanning voltage, such that the second output voltage output by the at least one of the two outermost columns of touch electrodes during the first period of the second touch cycle is equal to the reference voltage.

In an embodiment, the voltage control portion is further configured to superimpose the compensation signal with the first scanning voltage to obtain the second scanning voltage. If the difference is positive, the compensation signal is a positive voltage signal; and if the difference is negative, the compensation signal is a negative voltage signal. The voltage applying portion is further configured to apply the second scanning voltage to the at least one of the two outermost columns of touch electrodes during the first period of the second touch cycle.

In an embodiment, the voltage applying portion is further configured to apply, during each period of each touch cycle other than the first period, the reference voltage to several outermost columns of touch electrodes of the touch display panel among the columns of touch electrodes to which the scanning voltage has not been applied during the touch cycle.

In an embodiment, the voltage applying portion is further configured to apply, during each period of each touch cycle other than the first period, the reference voltage to 4 outermost columns of touch electrodes of the touch display panel among the columns of touch electrodes to which the scanning voltage has not been applied during the touch cycle.

In an embodiment, the voltage applying portion is further configured to apply, during each period of each touch cycle other than the first period, the reference voltage to the columns of touch electrodes other than the two outermost columns of touch electrodes sequentially according to an arrangement sequence of the multiple columns of touch electrodes.

The present disclosure further provides a touch display panel which includes a common electrode extending in a first direction, a plurality of columns of touch electrodes extending parallel to each other in a second direction, and the above voltage driving device for the touch display panel. The first direction intersects the second direction. The voltage detection portion of the voltage driving device is connected to two outermost columns of touch electrodes among the plurality of columns of touch electrodes, and is configured to detect a voltage output by at least one of the two outermost columns of touch electrodes during a first period of a first touch cycle.

BRIEF DESCRIPTION OF THE FIGURES

FIG. 2 is a schematic flow chart of a voltage driving method for a touch display panel provided by the present disclosure;

FIG. 3 is a schematic diagram of voltage closed-loop control of a touch display panel provided by the present disclosure;

DETAILED DESCRIPTION

The embodiments of the present disclosure will be clearly and completely described below in conjunction with the accompanying drawings. It should be noted that the described embodiments are some of the embodiments of the present disclosure, instead of all of the embodiments. All other embodiments obtained by a person of ordinary skill in the art based on the embodiments of the present disclosure without creative efforts are within the protective scope of the present disclosure.

In some cases, a touch mode known as touch and display driver integration long HBlanking (TDDI LHB) is adopted in a liquid crystal display panel including a touch display panel; that is, a display operation and a touch scanning operation are performed alternately multiple times during one display cycle. The touch display panel generally includes a plurality of columns of touch electrodes, and the plurality of columns of touch electrodes are scanned by time division multiplexing a common electrode Tx.

In some cases, the touch display panel includes 18 columns of touch electrodes. In order to keep capacitances of the 18 columns of touch electrodes consistent, the common electrode applies a same voltage to the touch electrodes at a same frequency. However, due to the grounding wire in the periphery of the touch display panel and some other unstable factors, a significant parasitic capacitance is generated in the periphery of the display panel, resulting in an unstable voltage in the periphery of the display panel.

Figure 1:
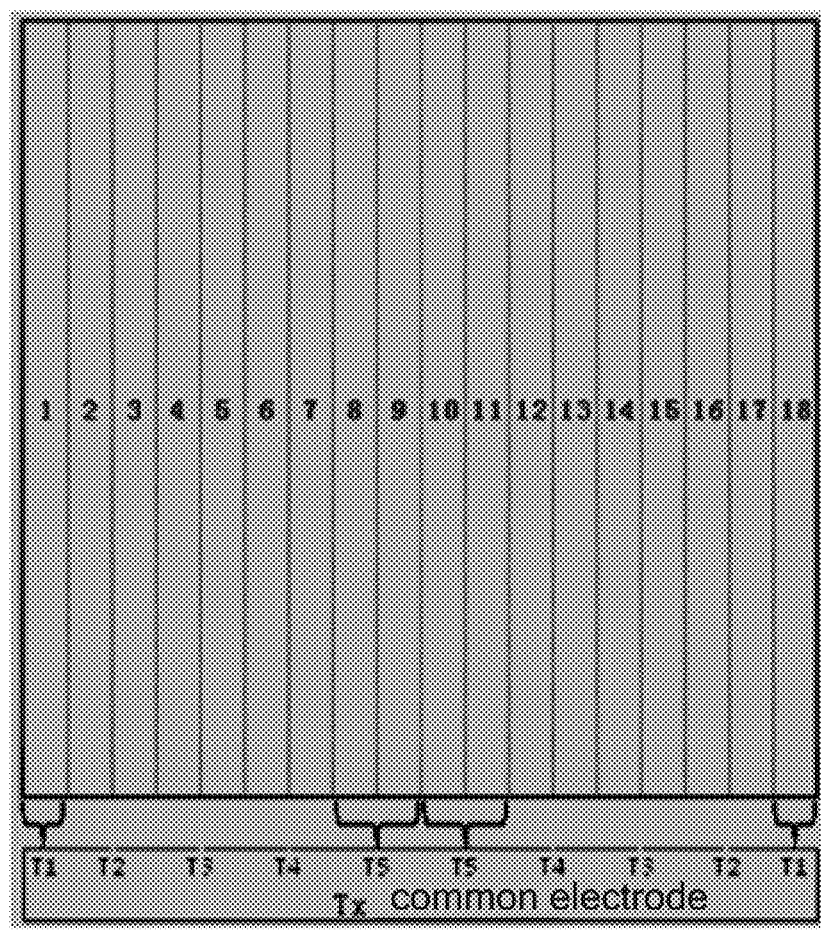
FIG. 1 is a schematic diagram of charging of touch electrodes of a touch display panel provided by the present disclosure.

The present disclosure provides a voltage driving method for a touch display panel, which is used to control output voltages applied to the touch electrodes of the touch display panel. As shown in FIG. 1, the touch display panel includes a common electrode Tx extending in a first direction and a plurality of columns of touch electrodes extending parallel to each other in a second direction. In an embodiment of the present disclosure, the first direction is perpendicular to the second direction, and there are 18 columns of touch electrodes.

The voltage driving method for the touch display panel will be described in detail below with reference to FIGS. 1 and 2, and the method includes the following steps.

In Step 101, during a first touch cycle including a plurality of periods, a respective scanning voltage is applied to each column of touch electrodes of the touch display panel by time division multiplexing the common electrode Tx. In some embodiments, a first scanning voltage is applied to two outermost columns of touch electrodes of the touch display panel during a first period of the first touch cycle, and a third scanning voltage is applied to touch electrodes of the touch display panel other than the two outermost columns of the touch electrodes during remaining periods of the first touch cycle.

Specifically, as shown in FIG. 1, the 18 columns of touch electrodes are arranged from left to right in a first direction. One touch cycle may be divided into 5 periods (i.e., T1-T5), and the 18 columns of touch electrodes are grouped into a plurality of groups of touch electrodes. In the process of scanning the touch electrodes, a respective scanning voltage is applied to each group of touch electrodes of the touch display panel by time division multiplexing the common electrode Tx. That is, during one period of one touch cycle, only one group of touch electrodes is applied with a respective scanning voltage via the common electrode Tx by using a voltage applying portion of a voltage driving device for the touch display panel; and during one touch cycle, all columns of touch electrodes of the touch display panel are scanned. In some embodiments, the two outermost columns of touch electrodes of the touch display panel (i.e., the first and $18^{th}$ columns of touch electrodes from left to right in the first direction) are grouped into one group, and the first scanning voltage is applied to the first and 18$^{th}$ columns of touch electrodes via the common electrode Tx during the first period T1 of the first touch cycle.

It should be noted that, during the first touch cycle, the respective scanning voltage applied to each column of touch electrode of the touch display panel is a reference voltage. That is, both the first scanning voltage and the third scanning voltage are equal to the reference voltage. The reference voltage may be a voltage preset in the voltage applying portion of the voltage driving device for the touch display panel.

In Step 102, a first output voltage output by at least one of the two outermost columns of touch electrodes of the touch display panel are detected during the first period of the first touch cycle.

In some embodiments, during the first period T1 of the first touch cycle, a voltage detection portion of the voltage driving device for the touch display panel detects the first output voltage output by at least one of the first and 18$^{th}$ columns of touch electrodes. The first output voltage is proportional to a capacitance of the at least one of the first and 18$^{th}$ columns of touch electrodes.

Due to the grounding wire in the periphery of the touch display panel and some other unstable factors, a significant parasitic capacitance is generated in the periphery of the touch display panel, which affects the stability of the voltage in the periphery of the touch display panel. That is, when the first scanning voltage applied to the first and 18$^{th}$ columns of touch electrodes of the touch display panel by the voltage applying portion of the voltage driving device for the touch display panel is the reference voltage, the first output voltage may be not equal to the reference voltage, i.e., the first output voltage of the at least one of the two outermost columns of touch electrodes detected in the Step 102 is generally not equal to the reference voltage.

In Step 103, a scanning voltage applied to the at least one of the two outermost columns of touch electrodes of the touch display panel during a first period of a second touch cycle immediately after the first touch cycle, is adjusted to a second scanning voltage by using the detected first output voltage, such that a second output voltage output by the at least one of the two outermost columns of touch electrodes of the touch display panel during the first period of the second touch cycle is the reference voltage.

In some embodiments, according to the first output voltage detected by the voltage detection portion and the reference voltage, a voltage control portion of the voltage driving device for the touch display panel adjusts, to the second scanning voltage, the scanning voltage applied to the at least one of the first and 18$^{th}$ columns of touch electrodes during the first period T1 of the second touch cycle, such that the second output voltage output by the at least one of the first and 18$^{th}$ columns of touch electrodes during the first period T1 of the second touch cycle is the reference voltage.

In some embodiments, as shown in FIG. 3, the voltage control portion calculates a difference by subtracting the first output voltage from the reference voltage to form a compensation signal, and the compensation signal is used to compensate the first scanning voltage to obtain the second scanning voltage applied to the at least one of the first and 18$^{th}$ columns of touch electrodes during the first period T1 of the second touch cycle. The second scanning voltage causes the second output voltage output by the at least one of the first and 18$^{th}$ columns of touch electrodes during the first period of the second touch cycle to be equal to the reference voltage. In some embodiments, compensating the first scanning voltage by using the compensation signal includes superimposing the compensation signal with the first scanning voltage to obtain the second scanning voltage. The first output voltage of the at least one of the two outermost columns of touch electrodes of the touch display panel is detected in real time, the detected first output voltage is subtracted from the output voltage (i.e., the reference voltage) of a column of touch electrode of the touch display panel other than the two outermost columns of touch electrodes to obtain a difference, and the obtained difference is directly applied to the first scanning voltage of the two outermost columns of touch electrodes of the touch display panel; and thus the deviation between a capacitance of the touch electrodes in the periphery of the touch display panel and a capacitance of the other touch electrodes of the touch display panel is eliminated, thereby stabilizing the voltage in the periphery of the touch display panel.

In some embodiments, if the difference is positive, that is, the reference voltage is higher than the first output voltage (which means that the capacitance of the at least one of the two outermost columns of touch electrodes of the touch display panel is lower than the capacitance of each of the other touch electrodes of the touch display panel), then the compensation signal is a positive voltage signal, such that the second scanning voltage applied to the at least one of the first and 18$^{th}$ columns of touch electrodes during the first period T1 of the second touch period is higher than the first scanning voltage; and if the difference is negative, that is, the reference voltage is lower than the first output voltage (which means that the capacitance of the at least one of the two outermost columns of touch electrodes of the touch display panel is higher than the capacitance of each of the other touch electrodes of the touch display panel), then the compensation signal is a negative voltage signal, such that the second scanning voltage applied to the at least one of the first and 18$^{th}$ column of touch electrodes during the first period T1 of the second touch period is lower than the first scanning voltage.

By the Steps 101-103, a closed-loop control of the scanning voltage applied to the two outermost columns of touch electrodes of the touch display panel can be achieved, such that the output voltage of the two outermost columns of touch electrodes of the touch display panel is consistent with the reference voltage. Therefore, the instability of the voltage in the periphery of the touch display panel caused by the parasitic capacitance in the periphery of the touch display panel can be substantially eliminated, and the touch performance is improved.

Further, the method may include the following step:

applying, during each period of each touch cycle other than the first period, the third scanning voltage equal to the reference voltage to one group of touch electrodes located at the outermost sides (including the left and the right sides) of the touch display panel, among the groups of touch electrodes to which a scanning voltage has not been applied during this touch cycle.

Specifically, the scanning process of the touch electrodes of the present disclosure during the periods T2-T5 is described in detail with reference to FIG. 1. In some embodiments, as shown in FIG. 1, during the period T2, the third scanning voltage is applied to one group of touch electrodes composed of the second, the third, the 16$^{th}$, and the 17$^{th}$ columns of touch electrodes; during the period T3, the third scanning voltage is applied to one group of touch electrodes composed of the 4$^{th}$, the 5$^{th}$, the 14$^{th}$, and the 15$^{th}$ columns of touch electrodes; during the period T4, the third scanning voltage is applied to one group of touch electrodes composed of the 6$^{th}$, the 7$^{th}$, the 12$^{th}$, and the 13$^{th}$ columns of touch electrodes; and during the period T5, the third scanning voltage is one a group of touch electrodes composed of the $8^{th}$, the $9^{th}$, the $10^{th}$, and the $11^{th}$ columns of touch electrodes.

In some embodiments, during each period of each touch cycle other than the first period, the third scanning voltage is applied sequentially to the columns of touch electrodes other than the two outermost columns of touch electrodes according to an arrangement sequence of the columns of touch electrodes. That is, during the periods T2 to T5, the third scanning voltage is applied to the second column of touch electrodes to the $17^{th}$ column of touch electrodes in this sequence.

In the TDDI LHB, a length of time of the display cycle including the time for display and the time for scanning touch electrodes is fixed. During one display cycle, the display operation and the touch scanning operation are performed alternately multiple times, and only part of the touch display panel is displayed during each display operation, and only a portion of the touch electrodes are scanned during each touch scanning operation. The time for each touch scanning operation includes a scanning preparation time with a fixed length of time, and the time for scanning one column of touch electrode is fixed. Therefore, if the number of touch scans required for scanning all of the 18 columns of touch electrodes is too large, a total time for scanning the 18 columns of touch electrodes may be too long, which results in insufficient time for display and insufficient liquid crystal charging time, and thus the image quality of the liquid crystal touch display panel will be abnormal. If the number of touch scans required for scanning the 18 columns of touch electrodes is too small, the number of touch electrodes scanned by each touch scanning operation is too large, which results in too long time for each touch scanning operation, and thus a time interval between displaying part of the touch display panel before each touch scanning operation and displaying part of the touch display panel after this touch scanning operation is too long. Therefore, a time interval between a leakage current existing in the pixels of the touch display panel for displaying the part of the touch display panel before the each touch scanning operation and a leakage current existing in the pixels of the touch display panel when displaying the part of the touch display panel before this touch scanning operation is too long, such that the difference between the a brightness of the part of the touch display panel displayed before each touch scanning operation and a brightness of the part of the touch display panel displayed after this touch scanning operation is too large. In a case that the human eye may recognize this difference in brightness, LHB horizontal stripes appear on the touch display panel.

Thus, in an embodiment of the present disclosure, the number of scans in the TDDI LHB scanning scheme is moderate. For example, the time for scanning the touch electrodes in one display cycle is divided into 10 periods, in which the first 5 periods form one touch cycle while the last 5 periods form another touch cycle, and all the 18 columns of touch electrodes are scanned during each touch cycle. This means that, during each of the touch cycles, during the four periods T2-T5 other than the first period, four columns of touch electrodes need to be scanned during each period on average. It should be noted that, in order that the touch uniformity is optimized, it is required that the number of load scanned during each period is the same (i.e., the number of the columns of the scanned touch electrodes during each period is the same) and load scanned during each period is bilaterally symmetric (i.e., during each period, the same number of columns of touch electrodes are scanned respectively on the left and right sides of the center position of the touch display panel, and positions of the scanned touch electrodes are symmetric with respect to the center position of the touch display panel). Thus, during each of the periods T2-T5 of a touch cycle, the third scanning voltage is applied to the outermost group (i.e., 4 columns) of touch electrodes among the groups of touch electrodes to which a scanning voltage has not been applied during the touch cycle.

It should be noted that, in the present disclosure, during each touch cycle, the first period T1 is before the second period T2, the second period T2 is before the third period T3, the third period T3 is before the fourth period T4, and the fourth period T4 is before the fifth period T5.

In some embodiments, during each of the periods other than the first period, 6 columns of touch electrodes instead of 4 columns of touch electrodes may be scanned as a group of touch electrodes. In addition, in some embodiments, during each touch cycle, an appropriate scanning voltage is applied to the two outermost columns of touch electrodes during the first period, and a scanning voltage may be applied to the groups of touch electrodes other than the two outermost columns of touch electrodes in a sequence different from the sequence disclosed above, as long as each column of touch electrodes is applied with an appropriate scanning voltage during each touch cycle.

Figure 4:
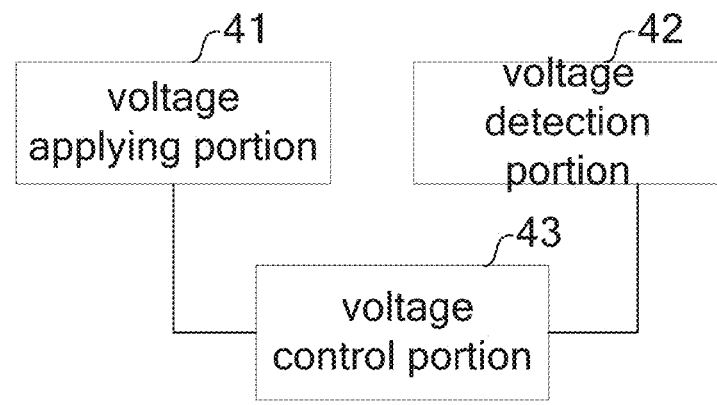
FIG. 4 is a structural diagram of a voltage driving device for a touch display panel provided by the present disclosure.

The present disclosure further provides the voltage driving device for the touch display panel. As shown in FIG. 4, the voltage driving device includes the voltage applying portion 41, the voltage detection portion 42, and the voltage control portion 43.

The voltage applying portion 41 is configured to apply the respective scanning voltage to each column of touch electrodes of the touch display panel during the first touch cycle including multiple periods by time division multiplexing the common electrode, and apply the first scanning voltage being equal to the reference voltage to the two outermost columns of touch electrodes of the touch display panel during the first period of the first touch cycle.

The voltage detection portion 42 is configured to detect the first output voltage output by the at least one of the two outermost columns of touch electrodes during the first period of the first touch cycle.

The voltage control portion 43 is configured to control the voltage applying portion 41 to adjust, to a second scanning voltage, the scanning voltage applied to the at least one of the two outermost columns of touch electrodes during the first period of the second touch cycle immediately after the first touch cycle by using the detected first output voltage, such that the second output voltage output by the at least one of the two outermost columns of touch electrodes during the first period of the second touch cycle is equal to the reference voltage.

In some embodiments, the voltage applying portion 41 is further configured to apply the scanning voltage, which is equal to the reference voltage, to each column of touch electrodes of the touch display panel during the first touch cycle.

In some embodiments, the voltage control portion 43 is further configured to calculate a difference by subtracting the first output voltage from the reference voltage to form the compensation signal, and compensate the first scanning voltage by using the compensation signal to obtain the second scanning voltage, such that the second output voltage output by the at least one of the two outermost columns of touch electrodes during the first period of the second touch cycle is the reference voltage.

In some embodiments, the voltage control portion 43 is further configured to superimpose the compensation signal with the first scanning voltage to obtain the second scanning voltage which is applied to the at least one of the two outermost columns of touch electrodes during the first period of the second touch control cycle, and send the second scanning voltage to the voltage applying portion 41. If the difference is positive, the compensation signal is a positive voltage signal; and if the difference is negative, the compensation signal is a negative voltage signal.

The voltage applying portion 41 is further configured to apply the second scanning voltage to the at least one of the two outermost columns of touch electrodes during the first period of the second touch cycle.

The voltage applying portion 41 is further configured to apply, during each period of each touch cycle other than the first period, the third scanning voltage which is equal to the reference voltage to several columns of touch electrodes at the outermost sides (including both the left side and the right side) of the touch display panel, among the columns of touch electrodes to which the scanning voltage has not been applied during this touch cycle.

In some embodiments, the voltage applying portion 41 is further configured to apply, during each period of each touch cycle other than the first period, the third scanning voltage to 4 columns of touch electrodes at the outermost sides (including both the left side and the right side) of the touch display panel, among the columns of touch electrodes to which the scanning voltage has not been applied during this touch cycle.

In some embodiments, the voltage applying portion 41 is configured to sequentially apply, during each period of each touch cycle other than the first period, the third scanning voltage to the columns of touch electrodes other than the two outermost columns of touch electrodes according to an arrangement sequence of the columns of touch electrodes.

The voltage driving device for the touch display panel provided by the present disclosure can achieve the closed-loop control of the scanning voltage applied to the two outermost columns of touch electrodes of the touch display panel, such that the output voltage of the two outermost columns of touch electrodes of the touch display panel is consistent with the reference voltage. Therefore, the instability of the voltage in the periphery of the touch display panel caused by the parasitic capacitance in the periphery of the touch display panel can be substantially eliminated, and the touch performance is improved.

The voltage driving method and the voltage driving device for the touch display panel of the present disclosure, by performing the closed-loop control on the scanning voltage applied to the outermost touch electrodes of the touch display panel, real-time adjust the capacitances of the touch electrodes located in the periphery of the touch display panel such that the capacitances of the touch electrodes located in the periphery of the touch display panel are consistent with the capacitances of other touch electrodes of the touch display panel, thereby solving the problem that the voltage in the periphery of the touch display panel is unstable due to the grounding wire GND in the periphery of the touch display panel and other unstable factors.

The voltage detection portion of the present disclosure may be a voltage detection circuit known in the art which is connected to the two outermost columns of touch electrodes and detects the voltages output by the two outermost columns of touch electrodes during the first period of the first touch cycle. The voltage applying portion and the voltage control portion of the present disclosure each may be achieved by a shifting register known in the art which applies a driving voltage to each column of touch electrodes as needed.

Figure 5:
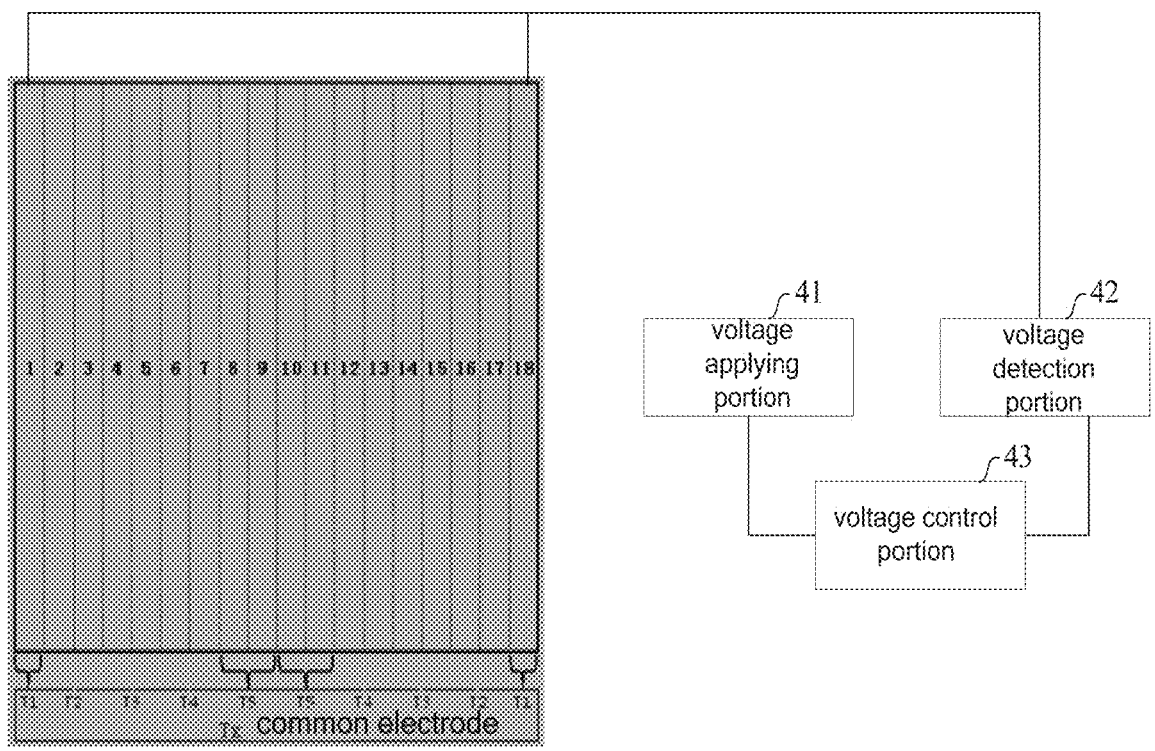
FIG. 5 is a schematic diagram of a touch display panel provided by the present disclosure.

Thereby, the present disclosure further provides a touch display panel as shown in FIG. 5, which includes a common electrode extending in a first direction, a plurality of columns of touch electrodes extending parallel to with each other in a second direction which intersects the first direction, and the voltage driving device described above. The voltage detection portion of the voltage driving device is connected to the two outermost columns of touch electrodes among the plurality of columns of touch electrodes, and is configured to detect voltages output by the two outermost columns of touch electrodes during the first period of the first touch cycle.

It will be appreciated that the above implementations are only exemplary implementations for illustrating the principle of the present disclosure. However, the present disclosure is not limited thereto. An ordinary person skilled in the art can make various modifications and improvements to the present disclosure without departing from the spirit and essence of the present disclosure. These modifications and improvements should be also considered as the protective scope of the present disclosure.

What is claimed is:

1. A voltage driving method for a touch display panel comprising a common electrode extending in a first direction and a plurality of columns of touch electrodes extending parallel to each other in a second direction, the first direction intersecting the second direction, the method comprising:
   applying a first scanning voltage to two outermost columns of touch electrodes of the touch display panel during a first period of a first touch cycle, the first touch cycle comprising a plurality of periods, the first scanning voltage being equal to a reference voltage;
   detecting a first output voltage output by at least one of the two outermost columns of touch electrodes during the first period of the first touch cycle; and
   adjusting, based on the detected first output voltage, a scanning voltage applied to the at least one of the two outermost columns of touch electrodes during a first period of a second touch cycle immediately after the first touch cycle to a second scanning voltage, such that a second output voltage output by the at least one of the two outermost columns of touch electrodes during the first period of the second touch cycle is equal to the reference voltage.

2. The method of claim 1, wherein, during periods of the first touch cycle other than the first period, the reference voltage is applied to each column of touch electrodes of the touch display panel other than the two outermost columns of touch electrodes.

3. The method of claim 2, wherein the adjusting, based on the detected first output voltage, the scanning voltage applied to the at least one of the two outermost columns of touch electrodes during the first period of the second touch cycle immediately after the first touch cycle to the second scanning voltage, such that the second output voltage output by the at least one of the two outermost columns of touch electrodes during the first period of the second touch cycle is equal to the reference voltage comprises:
   calculating a difference by subtracting the first output voltage from the reference voltage to form a compensation signal, and compensating the first scanning voltage by using the compensation signal to obtain the second scanning voltage, such that the second output voltage output by the at least one of the two outermost columns of touch electrodes during the first period of the second touch cycle is equal to the reference voltage.

4. The method of claim 3, wherein the compensating the first scanning voltage by using the compensation signal comprises:
superimposing the compensation signal with the first scanning voltage to obtain the second scanning voltage; and
if the difference is positive, the compensation signal is a positive voltage signal, and if the difference is negative, the compensation signal is a negative voltage signal.

5. The method of claim 4, wherein the method further comprises:
applying, during each period of each touch cycle other than the first period, the reference voltage to several outermost columns of touch electrodes of the touch display panel among the columns of touch electrodes to which the scanning voltage has not been applied during the touch cycle.

6. The method of claim 5, wherein, during each period of each touch cycle other than the first period, the reference voltage is applied to 4 outermost columns of touch electrodes of the touch display panel among the columns of touch electrodes to which the scanning voltage has not been applied the scanning voltage during the touch cycle.

7. The method of claim 5, wherein, during each period of each touch cycle other than the first period, the reference voltage are sequentially applied to the columns of touch electrodes other than the two outermost columns of touch electrodes according to an arrangement sequence of the plurality of columns of touch electrodes.

8. The method of claim 1, wherein the adjusting, based on the detected first output voltage, the scanning voltage applied to the at least one of the two outermost columns of touch electrodes during the first period of the second touch cycle immediately after the first touch cycle to the second scanning voltage, such that the second output voltage output by the at least one of the two outermost columns of touch electrodes during the first period of the second touch cycle is equal to the reference voltage comprises:
calculating a difference by subtracting the first output voltage from the reference voltage to form a compensation signal, and compensating the first scanning voltage by using the compensation signal to obtain the second scanning voltage, such that the second output voltage output by the at least one of the two outermost columns of touch electrodes during the first period of the second touch cycle is equal to the reference voltage.

9. The method of claim 8, wherein the compensating the first scanning voltage by using the compensation signal comprises:
superimposing the compensation signal with the first scanning voltage to obtain the second scanning voltage; and
if the difference is positive, the compensation signal is a positive voltage signal, and if the difference is negative, the compensation signal is a negative voltage signal.

10. The method claim 1, wherein the method further comprises:
applying, during each period of each touch cycle other than the first period, the reference voltage to several outermost columns of touch electrodes of the touch display panel among the columns of touch electrodes to which the scanning voltage has not been applied during the touch cycle.

11. The method of claim 10, wherein, during each period of each touch cycle other than the first period, the reference voltage is applied to 4 outermost columns of touch electrodes of the touch display panel among the columns of touch electrodes to which the scanning voltage has not been applied the scanning voltage during the touch cycle.

12. The method of claim 10, wherein, during each period of each touch cycle other than the first period, the reference voltage are sequentially applied to the columns of touch electrodes other than the two outermost columns of touch electrodes according to an arrangement sequence of the plurality of columns of touch electrodes.

13. A voltage driving device for a touch display panel, the touch display panel comprising a common electrode extending in a first direction and a plurality of columns of touch electrodes extending parallel to each other in a second direction, the first direction intersecting the second direction,
the voltage driving device comprising a voltage applying portion, a voltage detection portion and a voltage control portion, wherein,
the voltage applying portion is configured to apply a first scanning voltage to two outermost columns of touch electrodes of the touch display panel during a first period of a first touch cycle, the first touch cycle comprising a plurality of periods, the first scanning voltage being equal to a reference voltage;
the voltage detection portion is configured to detect a first output voltage output by at least one of the two outermost columns of touch electrodes during the first period of the first touch cycle; and
the voltage control portion is configured to adjust, based on the detected first output voltage, a scanning voltage applied to the at least one of the two outermost columns of touch electrodes during a first period of a second touch cycle immediately after the first touch cycle to a second scanning voltage, such that a second output voltage output by the at least one of the two outermost columns of touch electrodes during the first period of the second touch cycle is equal to the reference voltage.

14. The voltage driving device for the touch display panel of claim 13, wherein the voltage applying portion is further configured to apply the reference voltage to each column of touch electrodes of the touch display panel other than the two outermost columns of touch electrodes, during periods of the first touch cycle other than the first period.

15. The voltage driving device for the touch display panel of claim 13, wherein the voltage control portion is further configured to calculate a difference by subtracting the first output voltage from the reference voltage to form a compensation signal, and compensate the first scanning voltage by using the compensation signal to obtain the second scanning voltage, such that the second output voltage output by the at least one of the two outermost columns of touch electrodes during the first period of the second touch cycle is equal to the reference voltage.

16. The voltage driving device for the touch display panel of claim 15, wherein the voltage control portion is further configured to superimpose the compensation signal with the first scanning voltage to obtain the second scanning voltage;
if the difference is positive, the compensation signal is a positive voltage signal, and if the difference is negative, the compensation signal is a negative voltage signal; and
the voltage applying portion is further configured to apply the second scanning voltage to the at least one of the two outermost columns of touch electrodes during the first period of the second touch cycle.

17. The voltage driving device for the touch display panel of claim 13, wherein the voltage applying portion is further configured to apply, during each period of each touch cycle other than the first period, the reference voltage to several outermost columns of touch electrodes of the touch display panel among the columns of touch electrodes to which the scanning voltage has not been applied during the touch cycle.

18. The voltage driving device for the touch display panel of claim 17, wherein the voltage applying portion is further configured to apply, during each period of each touch cycle other than the first period, the reference voltage to 4 outermost columns of touch electrodes of the touch display panel among the columns of touch electrodes to which the scanning voltage has not been applied during the touch cycle.

19. The voltage driving device for the touch display panel of claim 17, wherein the voltage applying portion is further configured to apply, during each period of each touch cycle other than the first period, the reference voltage to the columns of touch electrodes other than the two outermost columns of touch electrodes sequentially according to an arrangement sequence of the multiple columns of touch electrodes.

20. A touch display panel, comprising a common electrode extending in a first direction, a plurality of columns of touch electrodes extending parallel to each other in a second direction, and the voltage driving device for the touch display panel of claim 13, wherein the first direction intersects the second direction, and the voltage detection portion of the voltage driving device is connected to two outermost columns of touch electrodes among the plurality of columns of touch electrodes, and is configured to detect a voltage output by at least one of the two outermost columns of touch electrodes during a first period of a first touch cycle.

* * * * *